C. A. HIRTH.
CAGE FOR BALL BEARINGS.
APPLICATION FILED MAR. 19, 1913.
1,098,901. Patented June 2, 1914.
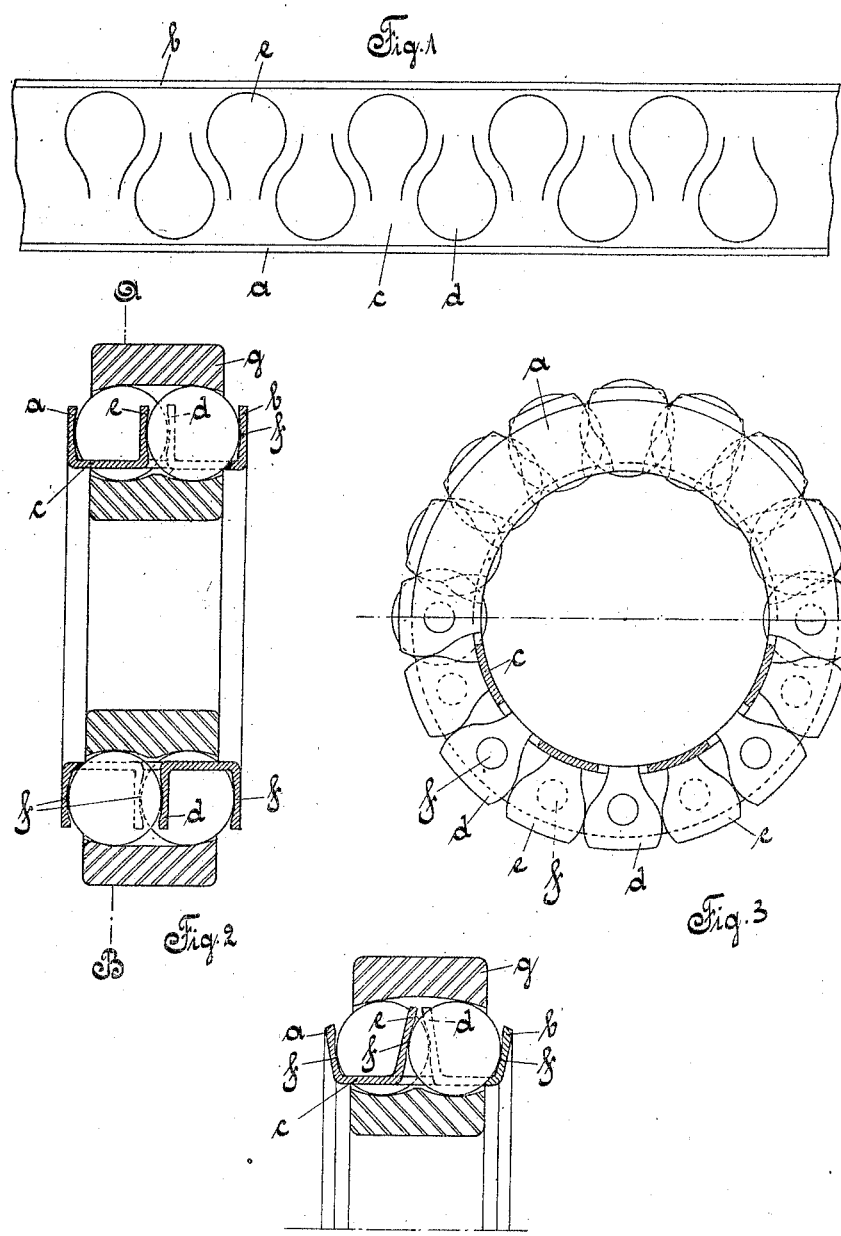

UNITED STATES PATENT OFFICE.

CARL ALBERT HIRTH, OF CANNSTATT-STUTTGART, GERMANY, ASSIGNOR TO NORMA-COMPAGNIE G. M. B. H., OF CANNSTATT-STUTTGART, GERMANY, A CORPORATION OF GERMANY.

CAGE FOR BALL-BEARINGS.

1,098,901.   Specification of Letters Patent.   Patented June 2, 1914.

Application filed March 19, 1913. Serial No. 755,347.

*To all whom it may concern:*

Be it known that I, CARL ALBERT HIRTH, a citizen of the German Empire, residing in Cannstatt-Stuttgart, in the Kingdom of Wurttemberg, in said Empire, have invented certain new and useful Improvements in Cages for Ball-Bearings, of which the following is a specification.

This invention relates to an improved cage for ball-bearings in which the balls are yieldingly held and guided at their turning poles, and it relates more especially to such a formation of the cage by which two rows of balls, which are arranged sidewise but extended alternately into each other, are employed, so that a double cage and a double ball-bearing is obtained.

It is obvious that ball-bearings having a single row of balls and various forms of cages, the row of balls could be duplicated sidewise of each other provided that said rows are held sufficiently apart that between them at least one yielding wall could be inserted, though thereby the most important advantage of these ball-bearings, namely, the small width of the same, would be lost. To overcome this objection, it may be possible to bend the wall between the two rows of balls in a wave or zigzag-like form, so that the balls of one row would enter the spaces between the balls of the other row; but a cage of this form would not only be very expensive, but also so heavy, so that the advantages which the holding and guiding of the balls at their poles, namely, little friction and heating would give, would be rendered nugatory by the fact that the pressure of the cage on the balls supported by the same would be increased by the greater weight of the cage, whereby again loss of friction and increased heating would be incurred.

The object of this invention is to overcome the objections to the double ball-bearing formed of two rows of balls by means of a cage the weight of which, notwithstanding that two rows of balls are supported by the same, is less than the weight of two cages, one for each row of balls, and even less than the weight of a single cage for one row of balls, of equal capacity and resistance, and which cage at the same time yields well to the balls and is in its entirety rigid enough so that it cannot be bent out of shape in handling the same. This is obtained by making the double cage from a ring of U-shaped cross-section, the side-walls of which impart the required degree of rigidity while the connecting portion is so incisioned that the balls can pass through the openings in the same into contact with the race of the retaining ring, without forming frictional contact with the edges of the openings.

In forming the cage no parts are cut out and removed, but are bent up alternately toward one or the other of the side-walls of the cage so as to form holders which together with one or the other of the side-walls support the ball of one or the other row of balls, so as to hold and guide them yieldingly at their turning poles. By this arrangement the balls of one row can enter as far as necessary one into the spaces between the balls of the other row, while in the portion connecting the side-walls sufficient stock is left for holding both side-walls rigidly together. The bent-up holders are so shaped that they form flat spring-shells having slight depressions for retaining the balls, the side-walls being likewise provided with slight depressions but without having discontinuities so that the required degree of strength is imparted to the entire cage. The double cage is therefore made up in all its parts only of sufficient material as is required for the special purpose of each one of its parts.

In the accompanying drawings are shown two embodiments of my improved cage for double ball-bearings, which show in Figure 1 a portion of the blank employed for the cage, in Fig. 2, a vertical central section through the cage and the retaining ring of the ball-bearing, drawn on a larger scale, in Fig. 3 in its upper half a plan-view of the cage and in the lower half a section on line A—B, Fig. 2 of the same, and in Fig. 4, a vertical transverse section of a modified construction of the double cage drawn on the same scale as Fig. 2.

Similar letters of reference indicate corresponding parts throughout the different figures of the drawings.

Referring to the drawings, *a* and *b* represent the side-walls of the U-shaped cage-ring, which is provided in its connecting portion *c* with incisions cut by means of dies so that two groups of disk-shaped holders *d* and *e* are formed, which extend alternately by their narrower ends or necks toward the side walls of the same, as shown clearly in Fig. 1. The holders *d* and *e* are bent up so as to be approximately parallel with the side-walls *a* and *b*, as shown respectively in Figs. 2 and 4. Each one of the holders *d* and *e* is provided with a slight spherical depression *f* in its ball-holding face, while the side-walls *a* and *b* are also provided diametrically thereto with slight depressions *f* of somewhat flatter curvature than the curvature of the balls, so that the balls can be readily inserted between the inner bent up holders and the side-walls of the cage, and made to project beyond the edges of the side-walls and beyond the openings in the transverse connecting portion whereby the balls of both rows are held and guided yieldingly at their turning-poles. It is not absolutely necessary that the depressions *f* should be in the form of a sphere, as they can be otherwise shaped, provided, however, that the contact between them and the balls takes place only at the turning-poles or close to the same. Care has to be taken that the holders *d* and *e* are not too long, so that they form contact with the retaining ring *g* of the bearing, as otherwise they would have to be slightly trimmed off, as shown in Fig. 3, so as to prevent any frictional contact with the retaining ring.

When the exterior retaining ring of the ball-bearing is not made cylindrical, as shown in Fig. 2, but made in the shape of an arc the center of which is in the central axis of the ball-bearing, then the side walls *a* and *b*, as well as the holders *d* and *e* cannot be bent up at right angles to said central axis, but have to be bent into a slightly inclined position so as to correspond to the slightly inclined position of the balls relatively to the inner surface or race of the outer retaining ring.

I claim:

1. A cage for double ball-bearings consisting of a ring-shaped body, side members on the body, holders bent up from incisioned portions in the body between the side members alternately in opposite directions so as to form two rows of bent-up holders, and to leave openings for the balls to pass therethrough, each row of bent-up holders being distanced from the farthest side member so as to hold and guide the balls yieldingly at their turning points.

2. A cage for double ball-bearings, consisting of a ring-shaped body, side members on the body, holders bent up from incisioned portions in the body between the side members alternately in opposite directions so as to form two rows of bent-up holders, and to leave openings for the balls to pass therethrough, each row of bent-up holders being distanced from the farthest side member so as to hold and guide the balls yieldingly at their turning points, and depressions in the holders and side members for retaining the balls.

In testimony, that I claim the foregoing as my invention, I have signed my name in presence of two subscribing witnesses.

CARL ALBERT HIRTH.

Witnesses:
  FRIDA KLABIER,
  HELENE WOLZ.

---

Copies of this patent may be obtained for five cents each, by addressing the "Commissioner of Patents, Washington, D. C."